United States Patent
Miyazaki et al.

[11] Patent Number: 5,517,488
[45] Date of Patent: May 14, 1996

[54] METHOD OF LOAD DISTRIBUTION FOR MESSAGE PROCESSING IN HOST SYSTEM IN LOCAL AREA NETWORK

[75] Inventors: Satoshi Miyazaki, Yamato; Kazuo Yagyu, Hiratsuka; Makoto Takahashi, Yokohama; Kazuo Orioka, Chigasaki, all of Japan

[73] Assignee: Hitachi, Ltd., Tokyo, Japan

[21] Appl. No.: 80,801

[22] Filed: Jun. 21, 1993

[30] Foreign Application Priority Data

Jun. 23, 1992 [JP] Japan .................................... 4-164544

[51] Int. Cl.$^6$ ....................................................... H04J 3/14
[52] U.S. Cl. .......................... 370/16; 370/60.1; 370/85.1; 370/94.1; 395/180; 395/181
[58] Field of Search .............................. 370/16, 58.3, 60, 370/60.1, 94.1, 85.1; 379/2; 371/8.1, 8.2, 11.1, 11.2

[56] References Cited

U.S. PATENT DOCUMENTS 5,016,244  5/1991  Mussey, Jr. et al. ..................... 370/16

FOREIGN PATENT DOCUMENTS 1-123545  5/1989  Japan ............................. H04L 11/00
4-167841  6/1992  Japan ............................. H04L 12/40

OTHER PUBLICATIONS

Comer, Douglas E. Internetworking with TCP/IP, vol. 1, Second Edition, Prentice–Hall, 1991, p. 63. (Japanese with English translation).

Primary Examiner—Douglas W. Olms
Assistant Examiner—Russell W. Blum
Attorney, Agent, or Firm—Fay, Sharpe, Beall, Fagan, Minnich & McKee

[57] ABSTRACT

An LAN system provided with a host system connected to an LAN through a plurality of LAN adapters, and a plurality of terminal systems for communicating with the host system through the LAN. A plurality of logical addresses for the host system are set correspondingly to physical addresses of the LAN adapters. One of the logical addresses is selected arbitrarily as a key (common) logical address. When the host system is to send a message to one of the terminal systems, the host system sets the key logical address of the host system as a source logical address included in the message, selects one of the LAN adapters and sends the message to the LAN through the selected LAN adapter. When one of the terminal systems is to send a message to the host system, the terminal system sets the key logical address of the host system as a destination logical address included in the message, sets the physical address of the LAN adapter corresponding to the key logical address as a destination physical address included in the message and sends the message to the LAN.

11 Claims, 9 Drawing Sheets

FIG. 3 HOST ADDRESS IN HOST SYSTEM

|  | PHYSICAL ADDRESS | LOGICAL ADDRESS |
|---|---|---|
| LAN ADAPTER 111 | a | A |
| LAN ADAPTER 112 | b | B |
| LAN ADAPTER 113 | c | C |

FIG. 5 TERMINAL ADDRESS IN HOST SYSTEM

|  | PHYSICAL ADDRESS | LOGICAL ADDRESS |
|---|---|---|
| TERMINAL SYSTEM 102 | d | D |
| TERMINAL SYSTEM 103 | e | E |

FIG. 6A TRANSMISSION DATA

| DESTINATION PHYSICAL ADDRESS | SOURCE PHYSICAL ADDRESS | DESTINATION LOGICAL ADDRESS | SOURCE LOGICAL ADDRESS | DATA |
|---|---|---|---|---|
| a | d | A | D |  |

FIG. 6B TRANSMISSION DATA

| DESTINATION PHYSICAL ADDRESS | SOURCE PHYSICAL ADDRESS | DESTINATION LOGICAL ADDRESS | SOURCE LOGICAL ADDRESS | DATA |
|---|---|---|---|---|
| d | a | D | A |  |

FIG. 8 TABLE FOR TERMINAL SYSTEM 102

|  | PHYSICAL ADDRESS | LOGICAL ADDRESS |
|---|---|---|
| HOST SYSTEM | a | A |
| TERMINAL SYSTEM 103 | e | E |

DATA TRANSMISSION PROCESSING IN HOST SYSTEM

DATA TRANSMISSION PROCESSING IN TERMINAL SYSTEM (T→H)

METHOD OF LOAD DISTRIBUTION FOR MESSAGE PROCESSING IN HOST SYSTEM IN LOCAL AREA NETWORK

BACKGROUND OF THE INVENTION

1. Field of the Invention

The present invention relates to a method of load distribution for message processing through a plurality of local area network adapters (hereinafter referred to as "LAN adapters") in a host system (hereinafter referred to as "server system") in a local area network system (hereinafter referred to as "LAN system") constituted by the host system (server system) and a plurality of terminal systems (hereinafter referred to as "client systems") connected to one and the same local area network (hereinafter referred to as "LAN") through the plurality of LAN adapters.

2. Description of the Related Art

With respect to addressing for a host system connected to one and the same LAN through a plurality of LAN adapters, methods are known heretofore as shown in the following three reference papers:

(1) A method of setting a plurality of logical addresses for a host system correspondingly to physical addresses of LAN adapters as described in Douglas E. Comer, "Internetworking with TCP/IP", Vol. 1, Second Edition, Prentice-Hall (1991), page 63 (reference paper (1)).

(2) A method of giving one common logical address to a plurality of LAN adapters connected to corresponding hosts respectively to thereby use the hosts as main systems as described in JP-A 1-123545 (reference paper (2)). With respect to the common address C in the method, one LAN adapter and a host corresponding to the LAN adapter serve as a main system but another LAN adapter and a host corresponding to the LAN adapter serve as a main system in case of a failure.

(3) A method used in an LAN system in which a plurality of LAN interfaces having peculiar allocated LAN addresses respectively are connected between an apparatus and an LAN, the apparatus being provided with means for selecting the lightest loaded LAN interface as a destination for communication from the plurality of LAN interfaces when the plurality of LAN interfaces receive a broadcasting frame, as described in JP-A 4-167841 (reference paper (3)).

SUMMARY OF THE INVENTION

The reference papers (1) and (2) have no consideration of load distribution for message handling in a host system.

In the reference paper (1), terminal systems require selecting logical addresses to be used in a host system correspondingly to LAN adapters for the purpose of performing load distribution for message handling in the host system. In this case, improvement of programs in the terminal systems, or the like, is however required so that load conditions of the LAN adapters being remote from the terminal systems can be known. Accordingly, it is difficult to select logical addresses of LAN adapters dynamically appropriately.

Also in the reference paper (2), terminal systems require selecting physical addresses to be used in a host system correspondingly to LAN adapters for the purpose of performing load distribution for message handling in the host system. Accordingly, there arises the same difficulty as that of the reference paper (1).

In the reference paper (3), when one LAN interface is once selected as a destination in response to a broadcasting frame, communication is thereafter continued through the destination. Accordingly, if loads imposed upon LAN interfaces change, efficient load distribution cannot be performed. For efficient load distribution, it may be thought of that a communication partner sends a broadcasting frame to LAN interfaces whenever a communication is made. In this case, it is however impossible to make communication efficiently.

Each of the reference papers (1) and (3) has no consideration of measures to counter failures in LAN adapters and LAN interfaces.

An object of the present invention is therefore to provide a method of load distribution for message processing in a host system (or server system) to thereby overcome the defects in the above-mentioned conventional techniques.

Another object of the present invention is to provide a method of load distribution for message processing in a host system (or server system), by which not only terminal systems (or client systems) can perform message transmission without consciousness of the existence of a plurality of LAN adapters for the host system (or server system) but the host system can perform message processing efficiently.

A further object of the present invention is to provide a method of load distribution for message processing in a host system (server system) to thereby facilitate management in terminal systems (or client systems) and the host system (or server system) at the time of occurrence of failure in an LAN adapter.

To achieve the foregoing objects, in accordance with an aspect of the present invention, in an LAN system provided with a host system connected to an LAN through a plurality of LAN adapters, and a plurality of terminal systems for communicating with the host system through said LAN, a method of load distribution for message processing in the host system in the LAN system comprising the steps of: (a) setting a plurality of logical addresses for the host system corresponding to physical addresses of the LAN adapters and selecting arbitrary one of the logical addresses as a key (common) logical address; and (b) setting the key logical address of the host system as a source logical address included in a message, selecting one of the LAN adapters and sending the message to the LAN through the selected LAN adapter when the host system is to send the message to one of the plurality of terminal systems.

Preferably the method of load distribution for message processing in the host system further includes the step of (c) setting the key logical address of the host system as a destination logical address included in a message, selecting a physical address of an LAN adapter corresponding to the key logical address as a destination physical address included in the message and sending the message to the LAN when one of the terminal systems is to send the message to the host system.

The key logical address of the host system connected to the LAN through the plurality of LAN adapters is regarded as a logical address of the host system connected to the LAN through a single LAN adapter from each of the terminal systems. Because an LAN adapter corresponding to the key logical address is determined in one-to-one correspondence, the physical address of the host system is regarded as one physical address. Accordingly, it is unnecessary that the terminal systems perform special processing for load distribution upon the host system connected to the LAN through the plurality of LAN adapters.

In the host system, reception messages are concentrated into an LAN adapter corresponding to the key logical address. Load distribution for message processing however can be achieved by distributing transmission data to a plurality of LAN adapters because the host system generally has a larger transmission data capacity than its reception data capacity.

In the case where each of the LAN adapters performs protocol processing inclusive of a transport layer, the step (b) is carried out as follows. When the communication mode of the message is connection-oriented, the LAN adapter corresponding to the key logical address is selected as the selected LAN adapter so that the message is transmitted to the LAN through the selected LAN adapter. When the communication mode of the message is connectionless, the smallest loaded LAN adapter is selected as the selected LAN adapter from the plurality of LAN adapters so that the message is transmitted to the LAN through the selected LAN adapter.

As an example of the present invention, in the step (b), the smallest loaded LAN adapter is selected as the selected LAN adapter from the plurality of LAN adapters.

As an example of selection of the smallest loaded LAN adapter, the host system examines the wait-before-transmit message capacities of the LAN adapters so that an LAN adapter having a wait-before-transmit message capacity not larger than a predetermined value can be selected as the selected LAN adapter when the LAN adapter having the wait-before-transmit message capacity not larger than the predetermined value exists, and an LAN adapter having the smallest wait-before-transmit message capacity can be selected as the selected LAN adapter when the LAN adapter having the wait-before-transmit message capacity not larger than the predetermined value does not exist.

As an example of the present invention, in the step (b), instead of selection of the smallest loaded LAN adapter, one of the LAN adapters is selected as the selected LAN adapter in predetermined order whenever at least one message is transmitted.

As described above, as an example of the present invention, the smallest loaded LAN adapter is selected for data transmission from the host system under the consideration of respective loads on the LAN adapters so that data is transmitted through the selected LAN adapter. Accordingly, load distribution is performed efficiently.

Further, as an example of the present invention, one of the LAN adapters is selected in predetermined order in accordance with data transmission from the host system so that data is transmitted through the selected LAN adapter. Accordingly, load distribution is performed efficiently.

As an example of the present invention, the key logical address is related to another normal LAN adapter when any failure occurs in the LAN adapter corresponding to the key logical address, and the host system does not select a failed LAN adapter at the time of transmitting of message when any failure occurs in the LAN adapter not corresponding to the key logical address.

In this case, as a further example of the present invention, the plurality of terminal systems are informed that the key logical address is related to the other normal LAN adapter.

As described above, the key logical address can be set so that the key logical address is related to another normal LAN adapter even in the case where any failure occurs in an LAN adapter corresponding to the key logical address. Accordingly, management at the time of occurrence of failure is easy.

As described above, in the present invention, a key logical address is set for a plurality of LAN adapters in a host system. Accordingly, terminal systems can transmit messages to the host system without consciousness of the existence of the plurality of LAN adapters. Further, the key logical address is used in the host system. Accordingly, load distribution for message processing is performed efficiently.

Further, because the key logical address is set, communication can be continued by using another normal LAN adapter at the time of occurrence of failure in an LAN adapter. In this case, LAN adapter switching and management can be performed easily in the terminal systems and the host system.

BRIEF DESCRIPTION OF THE DRAWINGS

FIG. 3 is a view showing a table of physical and logical addresses of the host system, provided in the host system depicted in FIG. 1;

FIG. 5 is a view showing a table of physical and logical addresses of terminal systems, provided in the host system depicted in FIG. 1;

FIGS. 6A and 6B are views showing transmission and reception data between the host system and the terminal systems;

FIG. 8 is a view showing a table of physical and logical addresses of the host system, provided in each of the terminal systems depicted in FIG. 1;

DESCRIPTION OF THE PREFERRED EMBODIMENTS

Embodiments of the present invention will be described below with reference to the accompanying drawings.

Figure 1:
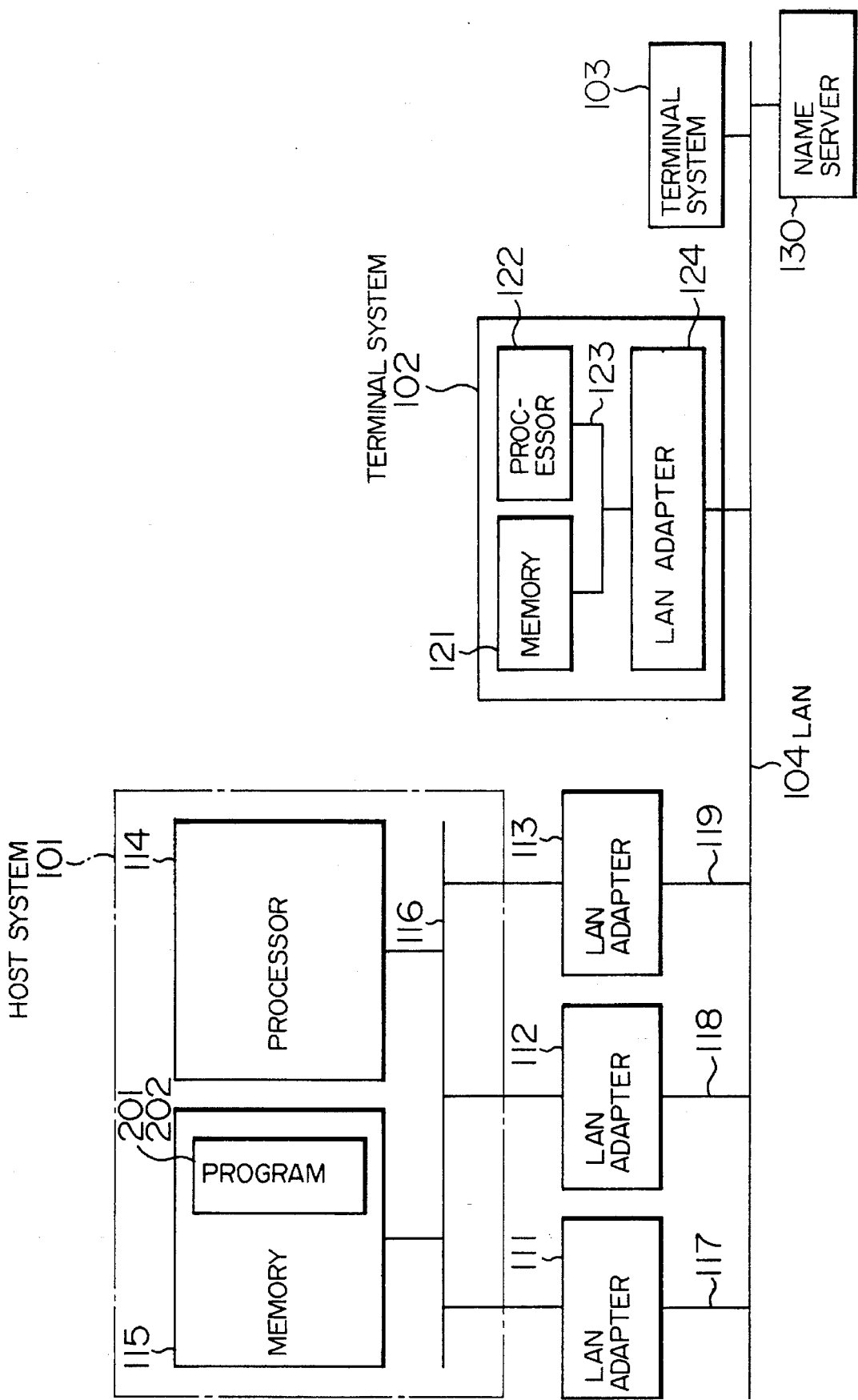
FIG. 1 is a block diagram of an LAN system using a method of load distribution for message processing in a host system in an LAN system according to an embodiment of the present invention.

FIG. 1 is a block diagram showing an example of the configuration of an LAN system according to an embodiment of the present invention. In FIG. 1, the LAN system has a host system 101 such as a file server, etc., an LAN 104 in accordance with IEEE 802.3 or the like, LAN adapters 111 to 113 for connecting the host system 101 to the LAN 104 correspondingly to LAN interface lines, terminal systems 102 and 103 such as workstations, personal computers, client systems, etc. connected to the LAN 104, and a name server 130 connected to the LAN 104. The host system 101 has a memory 115 for storing programs and data, a processor 114 for executing a program stored in the memory 115, and a bus 116 for connecting the LAN adapters 111 to 113, the memory 115 and the processor 114. The terminal system 102 has a memory 121, a processor 122, an LAN adapter 124, and a bus 123. The other terminal system 103 has the same configuration as that of the terminal system 102. The respective LAN adapters of the terminal systems may be provided in the outside of the terminal systems. The host system 101 may include the respective LAN adapters 111 to 113.

Although FIG. 1 shows as an example the case where the number of LAN adapters and the number of terminal systems are three and two respectively, there is no limitation upon the numbers from the point of view of the principle of the present invention. Further, this embodiment can be applied to an LAN system having a plurality of host systems.

This embodiment relates to the selection of the LAN adapters 111 to 113 by the host system 101 in the case where the host system 101 is to communicate with the terminal systems 102 and 103 through the LAN adapters 111 to 113 and the LAN 104. That is, this embodiment relates to a method in which an LAN adapter to be selected from the LAN adapters 111 to 113 is determined by not the terminal systems 102 and 103 but the host system 101 at the time of transmission of data to the terminal systems to thereby facilitate distribution of load to the LAN adapters.

Figure 2:
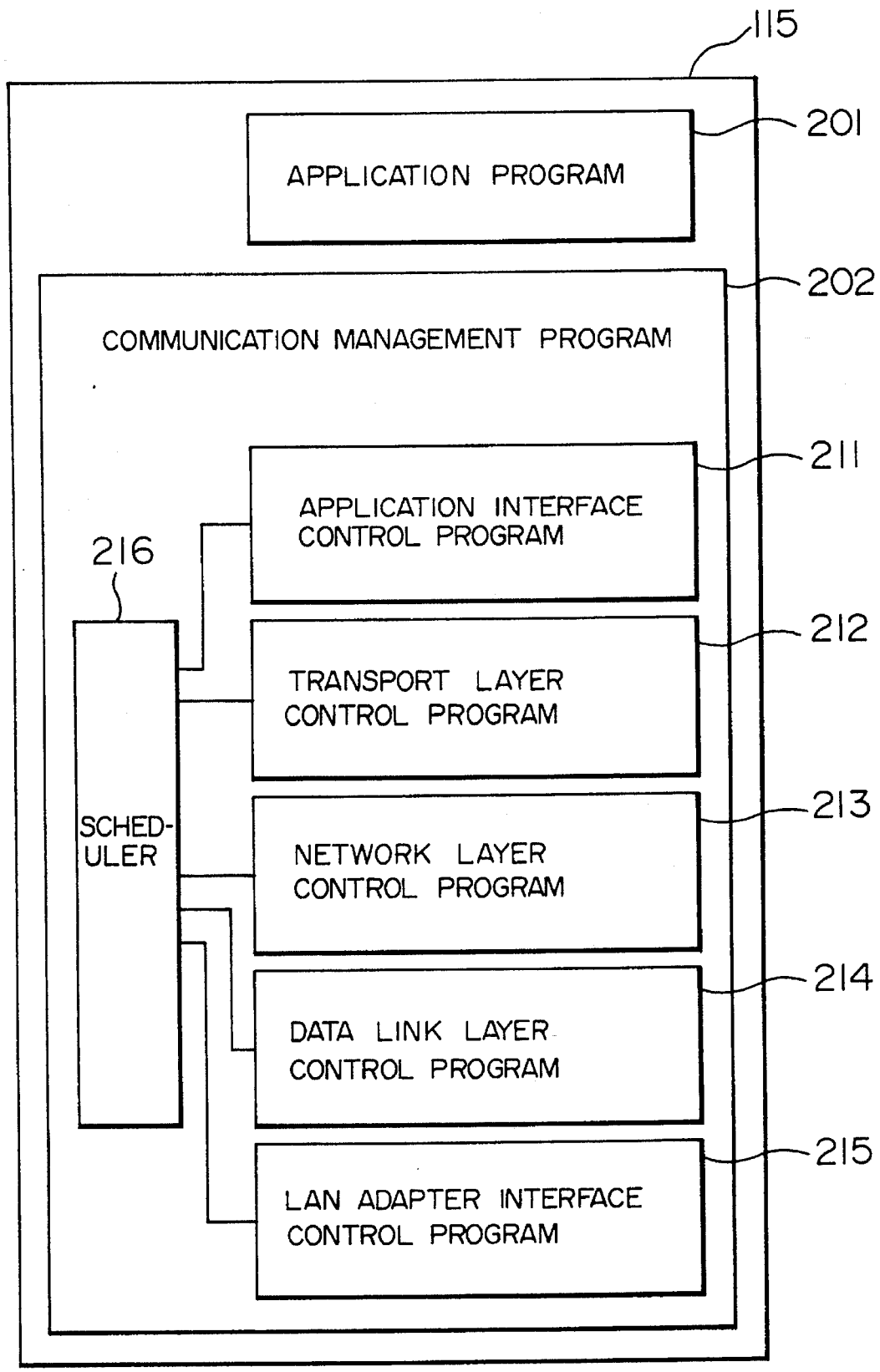
FIG. 2 is a block diagram showing the software configuration of the host system depicted in FIG. 1.

FIG. 2 is a block diagram showing an example of the software configuration stored in the memory 115 of the host system 101. The software configuration has an application program 201 for making the host system provide service to the terminal systems, and a communication management program 202 for processing a common communication protocol necessary for performing communication in the LAN system. As shown in FIG. 2, the communication management program 202 is constituted by an application interface control program 211 for controlling interfaces between the application program 201 and the communication management program 202, a transport layer control program 212 for processing a transport layer protocol in communication protocol layers, a network layer control program 213 for processing a network layer protocol in the communication protocol layers, a data link layer control program 214 for processing a data link layer protocol in the communication protocol layers, an LAN adapter interface control program 215 for controlling interfaces between the communication management program 202 and the LAN adapters 111 to 113, and a task scheduler 216 for managing the starting of the programs 211 to 215 and the like. Socket interface is known as an example of the application interface. TCP/IP is known as an example of the communication protocol. The details of these have been described, for example, in Douglas E. Comer, "Internetworking with TCP/IP", Vol. 1, Second Edition, Prentice-Hall (1991).

For example, as shown in FIG. 3, logical addresses for the host system 101 are determined correspondingly to physical addresses of the LAN adapters 111 to 113. Physical addresses for the host system 101 are generally determined in accordance with the hardware of the LAN adapters 111 to 113, so that the physical addresses are determined in accordance with the address convention of the connected LAN. In this embodiment, a key (common) logical address is selected to be arbitrary one of logical addresses of the LAN adapters 111 to 113, for example, logical address A corresponding to the LAN adapter 111.

The operation of transmitting/receiving data between the host system and the terminal systems in this embodiment will be described below.

The following description will be made upon the assumption of a connectionless protocol.

Communication protocols are generally classified into a connectionless type and a connection-oriented type. In the connectionless type protocol, there is no guarantee that a plurality of messages are transmitted/received between fixed systems. On the contrary, in the connection-oriented type protocol, a control message is transmitted/received to thereby give guarantee that a plurality of messages are transmitted/received between fixed systems. Accordingly, in the case where processing is made in accordance with such a connection-oriented type protocol, transmission/reception messages must be processed by one and the same apparatus.

That is, in the case where a message is to be transmitted in response to a message received by a certain apparatus, transmission processing must be performed by the apparatus.

Although this embodiment shows the case where the present invention is applied to the connectionless type protocol, it is a matter of course that the invention can be applied to the connection-oriented type protocol.

Figure 4:
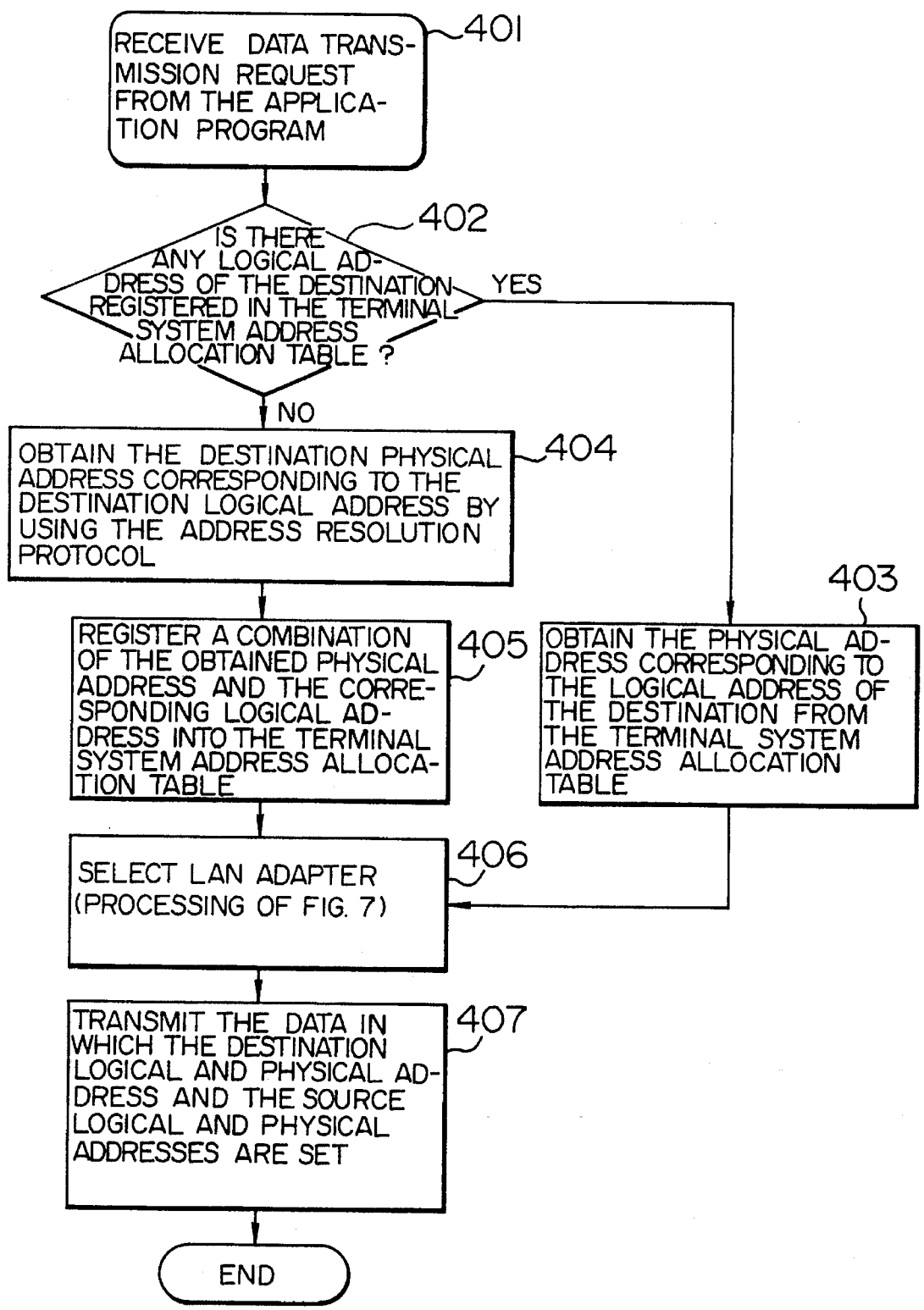
FIG. 4 is a flow chart for explaining data transmission processing in the host system depicted in FIG. 1.
Figure 7:
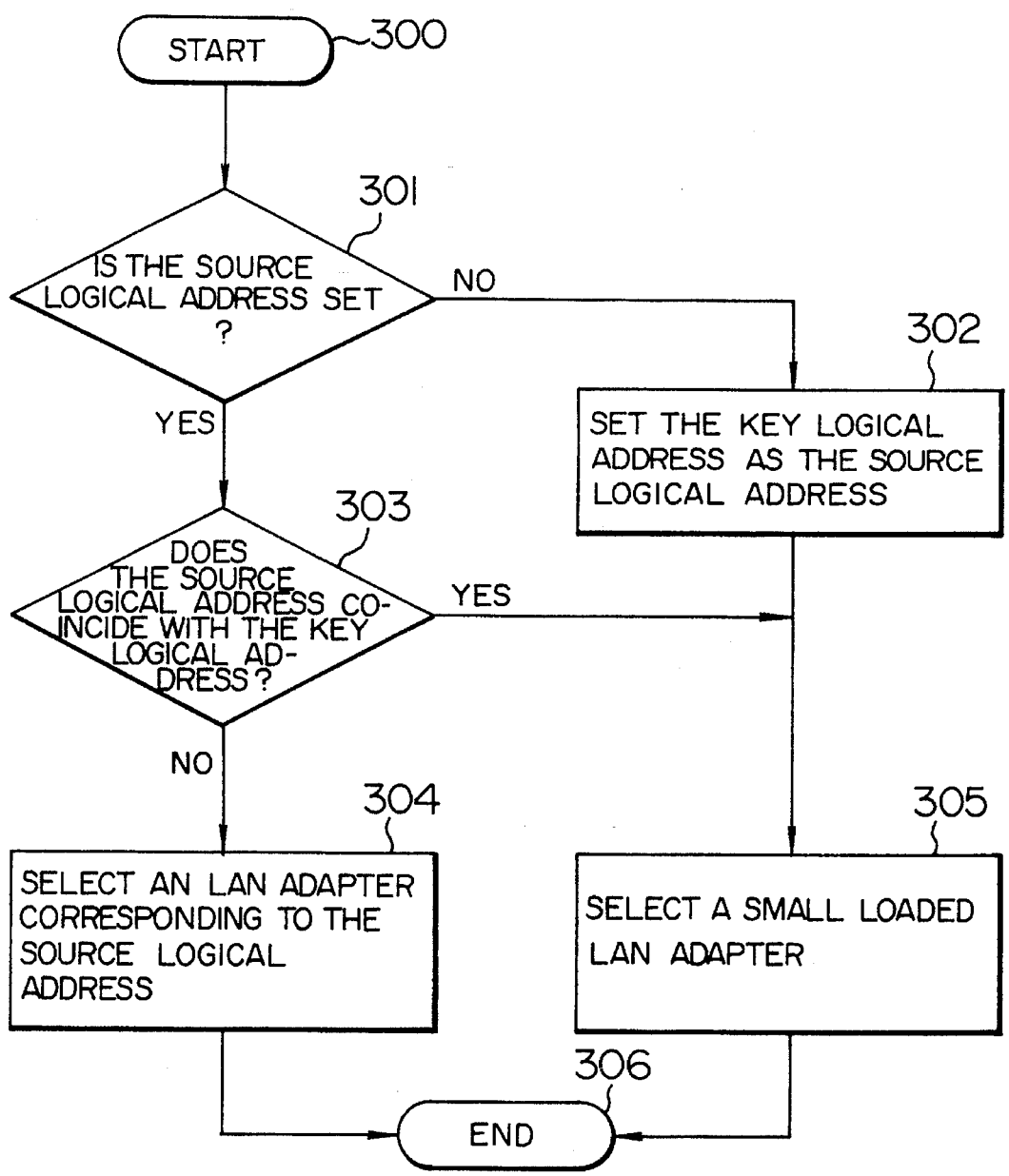
FIG. 7 is a flow chart showing LAN adapter selection processing in the communication management program in the host system, depicted in FIG. 2.

Referring first to FIGS. 4 and 7, the case of transmission of data from the host system 101 to another system such as for example the terminal system 102 which is a destination system will be described on the basis of flow charts of FIGS. 4 and 7. FIG. 4 is a flow chart for explaining data transmission processing in the host system depicted in FIG. 1. FIG. 7 is a flow chart showing LAN adapter selection processing in the communication management program in the host system, depicted in FIG. 2.

The operation of FIG. 4 is carried out in the communication management program 202. In FIG. 4, first, the application program 201 of the host system designates the physical address D of the terminal system 102 and sends a request to the communication management program to transmit data from the host system to the terminal system 102, so that the communication management program receives the data transmission request (step 401). Here, physical addresses of data destinations can be known by predetermination, inquiry to the name server, or the like. The term "predetermination" means that respective logical addresses of the terminal systems are set, for example, by a user through an input device (not shown) before the transmitting operation.. Alternatively, logical addresses corresponding to names of the terminal systems can be known by inquiry to the name server 130. The name server 130 may be realized within the host system 101.

Then, a judgment is made as to whether or not the logical address of the destination (terminal system 102) has been registered in the address allocation table of the terminal system shown in FIG. 5 (step 402).

The table of FIG. 5 is stored in the memory 115. In the case of FIG. 5, the physical and logical addresses of the terminal system 102 are replaced by D and d respectively while the physical and logical addresses of the terminal system 103 are replaced by E and e respectively. The physical addresses of the data destinations can be known preliminarily on the basis of predetermination, inquiry message used in an address resolution protocol, or the like. Such an address resolution protocol can make it possible to obtain a physical address corresponding to a logical address by using this protocol. The physical addresses and logical addresses thus obtained by the communication management program are registered in the table of FIG. 5.

When a decision in the step 402 is made that the logical address D of the destination (terminal system 102) has been registered in the table of FIG. 5, a physical address d corresponding to the logical address D of the destination is obtained from the table (step 403). Then, in step 406, an LAN adapter is selected in accordance with processing of FIG. 7 which will be described later. Then, in step 407, transmission data in which the destination logical and physical addresses D and d and the source logical and physical addresses (that is, the logical and physical addresses of the LAN adapter selected by the step 406) are set is transmitted from the selected LAN adapter to the LAN as will be described later. An example of the transmission data is shown in FIG. 6B.

On the contrary, when a decision in the step 402 is made that the logical address D of the destination (terminal system 102) has not yet registered in the table of FIG. 5, the logical and physical addresses of the destination are registered in the table by the following steps. First, in step 404, a physical address d corresponding to the logical address D of the destination is obtained by using an address resolution protocol included in the host system, so that a combination of the thus obtained physical address d and the corresponding logical address D is registered in the table (step 405). Then, steps 406 and 407 are carried out.

The details of the name server and the address resolution protocol have been described in Douglas E. Comer, "Internetworking with TCP/IP", Vol. 1, Second Edition, Prentice-Hall (1991).

Referring to FIG. 7, the LAN adapter selection processing in the step 406 will be described below.

In the communication management program 202, the application interface control program 211 processes a data transmission request given from the application program 201 to the terminal system 102 and delivers data to the transport layer control program 212. The transport layer control program performs processing necessary for execution of a transport layer protocol and delivers data to the network layer control program 213. The network layer control program performs processing necessary for execution of a network layer protocol and selects an LAN adapter in accordance with the flow chart of LAN adapter selection processing shown in FIG. 7. In FIG. 7, first, a judgment is made as to whether the application program 201 has already set the source logical address (the logical address of the LAN adapter which is to perform transmission) or not (step 301). When the source logical address has not yet set, the communication management program instead of the application program sets the key logical address A of the host system (step 302). On the contrary, when the source logical address has been already set, a judgment is made as to whether the set source logical address coincide with the key logical address A or not (step 303). When the source logical address does not coincide with the key logical address, an LAN adapter corresponding to the source logical address is selected by reference to the table of FIG. 3 (step 304). When the source logical address coincides with the key logical address A, a small loaded LAN adapter is selected by reference to the table of FIG. 3 (step 305). For example, the selection of the small loaded LAN adapter can be attained as follows. The processor system 101 inquires of the respective LAN adapters about the wait-before-transmit message capacities of the respective LAN adapters, regards an LAN adapter having a message capacity not larger than a predetermined value as the small loaded LAN adapter when such an LAN adapter exists, and regards an LAN adapter having the smallest message capacity as the small loaded LAN adapter when such an LAN adapter having a message capacity not larger than the predetermined value does not exist. The step 303 of FIG. 7 may be removed so that load distribution can be performed only in the case where the application program has not set the source logical address. After an LAN adapter is thus selected, the step 407 of FIG. 4 is carried out as follows.

As described above, the network layer control program 213 obtains the physical address corresponding to the destination logical address by predetermination, use of an address resolution protocol, or the like, and delivers data to the data link layer control program 214. The data link layer control program performs processing necessary for execution of a data link layer protocol and delivers data to the LAN adapter interface control program 215. The LAN adapter interface control program sends a data transmission request to the LAN adapter selected by the network layer control program. Then, the LAN adapter transmits a message as shown in FIG. 6B to the LAN.

Upon reception of the message from the host system, the communication management program of the terminal system delivers the transmission data from the host system to the application program.

In the following, the case of transmission of data from a terminal system, for example, 102, to another system, for example, the host system 101, will be described. Here, the memory in each of the terminal systems has an application program and a communication management program in the same manner as in FIG. 2 and further has a table (FIG. 8) of physical and logical addresses of the other systems (the host system and the terminal system) which are destination systems in the same manner as in FIG. 3. FIG. 8 shows a table for the terminal system 102.

First, the application program of the terminal system 102 knows the logical address A of the host system by predetermination, inquiry to the name server, or the like, sets the logical address A as a data destination and sends a data transmission request to the communication management program of the terminal system 102. The communication management program knows a physical address a corresponding to the logical address A by predetermination, use of an address resolution protocol, or the like, sets the physical address in the table of FIG. 8 and transmits a message as shown in Fig. 6A to the LAN.

Upon reception of the message from the terminal system 102 through the LAN adapter 111, the communication management program 202 of the host system delivers the transmission data from the terminal system 102 to the application program 201.

Figure 9:
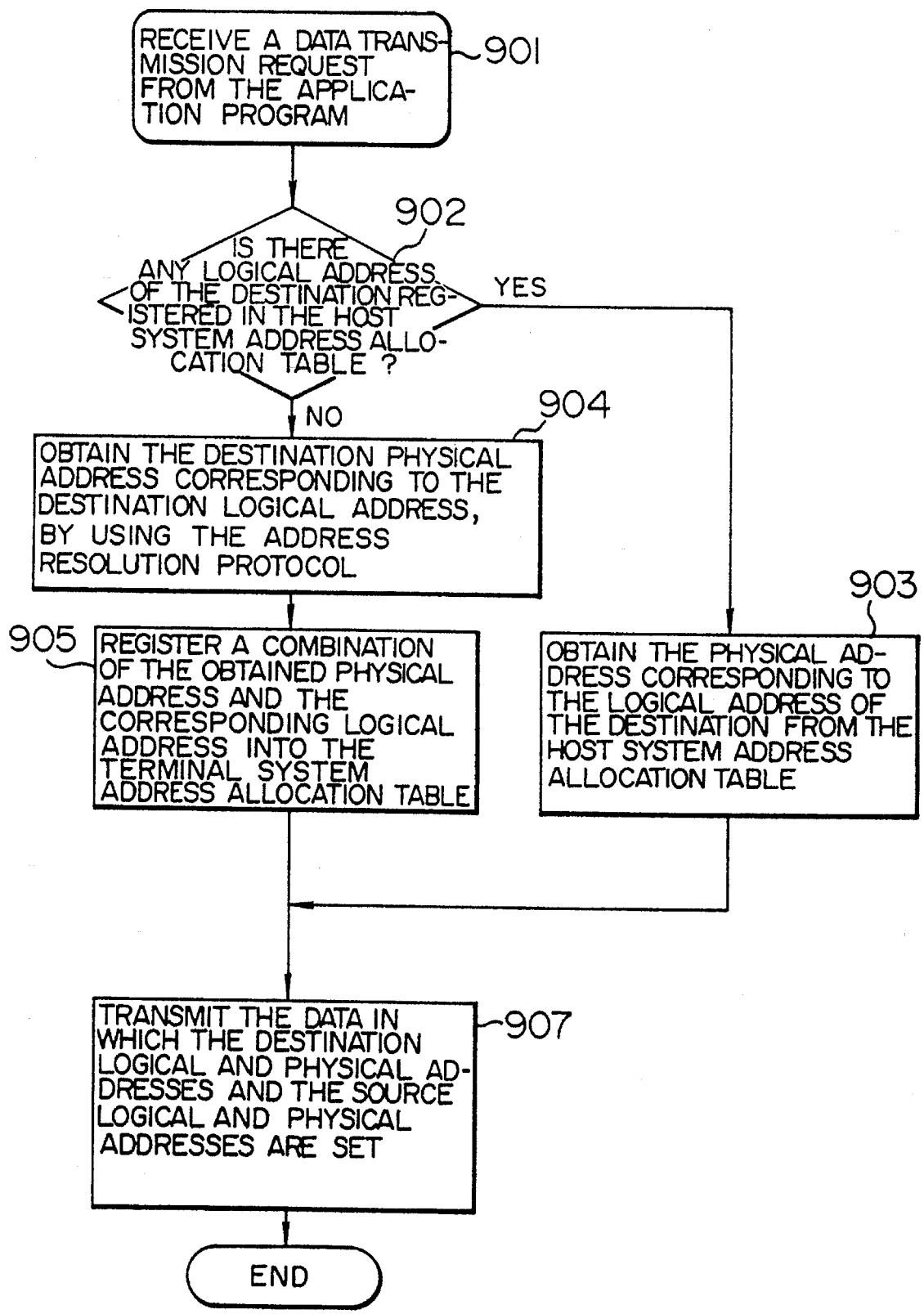
FIG. 9 is a flow chart for explaining data transmission processing in each of the terminal systems depicted in FIG. 1.

That is, transmission processing in the terminal system in the case where the logical address (destination logical address A) of the host system is designated by the application program of the terminal system 102 is as shown in the flow chart of FIG. 9. The transmission processing in the terminal system in this case is almost equal to the transmission processing in the host system shown in FIG. 4 but does not include the step 406 because the terminal system has a single LAN adapter. In the case where the terminal system has a plurality of LAN adapters, the processing may include the same procedure as the step 406. Procedures in steps 902, 903 and 905 corresponding to the steps 402, 403 and 405 in FIG. 4 are merely formed by replacing "terminal system address allocation table" in the respective steps 402, 403 and 405 by "host system address allocation table". Accordingly, in this case, the transmission message is as shown in FIG. 6A, so that the message is transmitted to the LAN adapter 111 corresponding to the destination logical address A.

The present invention can be also applied to the case where the LAN adapter of the host system performs processing up to data link layer control. In the case where the LAN adapter performs processing up to network layer control, LAN adapter selection processing in FIG. 7 is performed in the transport layer control program 212. In the following, the case where the LAN adapter performs processing up to transport layer control will be described.

Figure 10:
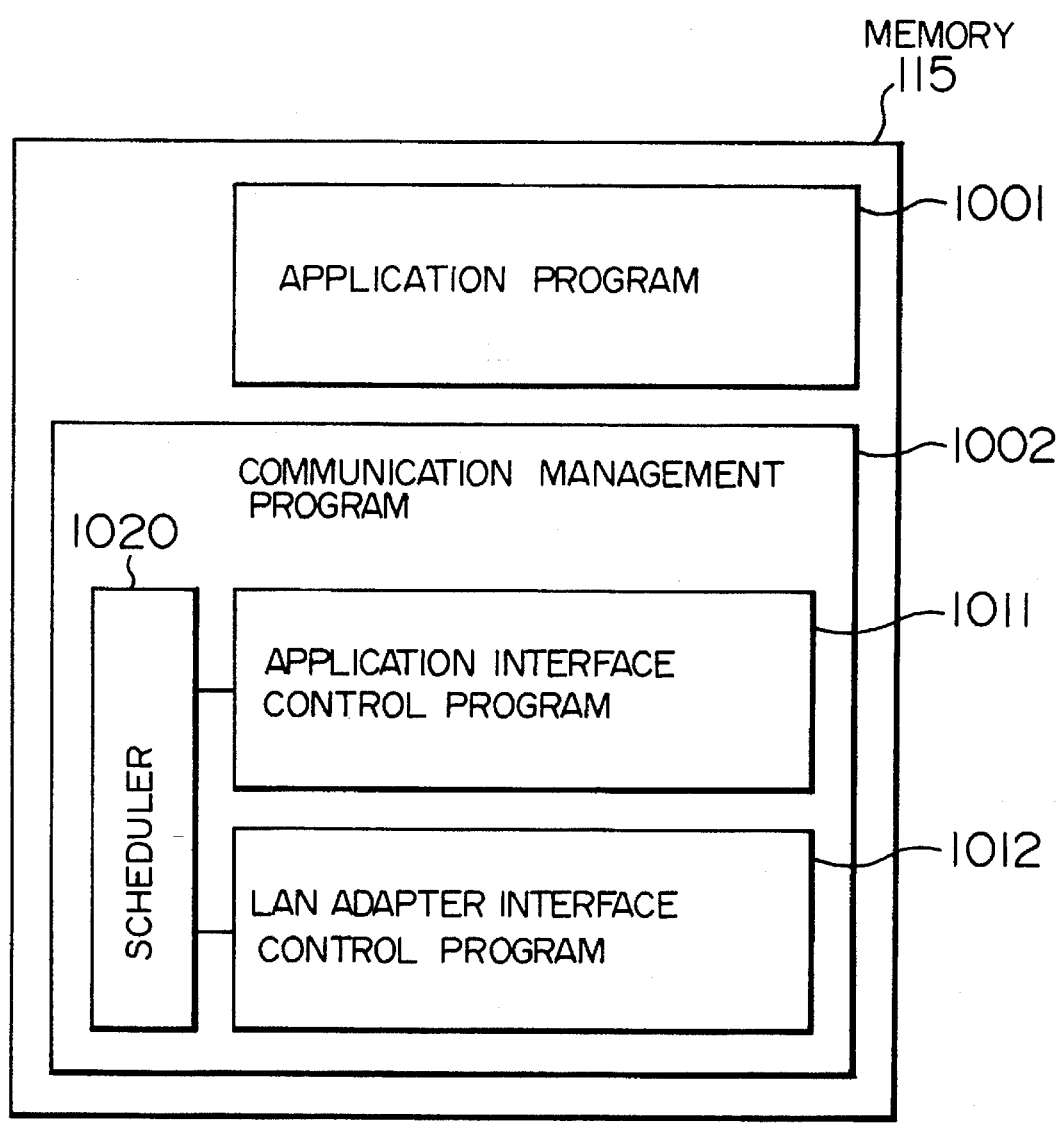
FIG. 10 is a block diagram showing the software configuration of the host system depicted in FIG. 1, in the case where each of the LAN adapters performs transport layer control.

FIG. 10 is a view showing an example of the software configuration of the host system 101 in the case where the LAN adapter performs data link layer control, network layer control and transport layer control. The reference numeral 1001 designates an application program for making the host system provide service to the terminal systems, and the reference numeral 1002 designates a communication management program for processing a common communication protocol necessary for performing communication in the LAN system. As shown in FIG. 10, the communication management program 1002 is constituted by an application interface control program 1011 for controlling interfaces between the application program 1001 and the communication management program 1002, and an LAN adapter interface control program 1012 for controlling interfaces between the communication management program 1002 and the LAN adapters 111 to 113. The starting control of the programs 1011 and 1012 is performed by a scheduler 1020.

The above description of the previous embodiment is applied to the case of transmission of data from the terminal system 102 to the host system 101 in this embodiment.

In the following, the case of transmission of data from the host system 101 to the terminal system 102 will be described. In the communication management program, the application interface control program 1011 processes a data transmission request from the application program 1001 to the terminal system 102 and selects an LAN adapter in accordance with the flow chart of LAN adapter selection processing in FIG. 7 in the same manner as in the previous embodiment because the LAN adapter which has performed reception processing must perform transmission processing, when the communication mode is connectionless. When the communication mode is connection-oriented, the step of "selecting an LAN adapter corresponding to the key logical address" is carried out instead of the step 305 in FIG. 7. Then, the application interface control program delivers data to the LAN adapter interface control program 1012. The LAN adapter interface control program sends a data transmission request to the LAN adapter selected by the application interface control program. The LAN adapter transmits a message to the LAN.

In the case where it is difficult to carry out the step 305 of FIG. 7 in the above-mentioned embodiment because it is impossible to examine the conditions of the LAN adapters or because overhead is large, load distribution is performed, for example, by the following method. That is, if the host system has the configuration shown in FIG. 1, LAN adapters are selected in predetermined order, for example, in the order of LAN adapters 111→112→113→111→112→113 in accordance with the transmission of messages. The present invention is not limited to the case where LAN adapters are switched from one to another whenever one message is transmitted. For example, LAN adapters may be switched from one to another whenever two messages are transmitted. In this manner, load distribution can be achieved approximately. The present invention can be also applied to the case where the network layer control program 213 performs LAN adapter selection.

Figure 11:
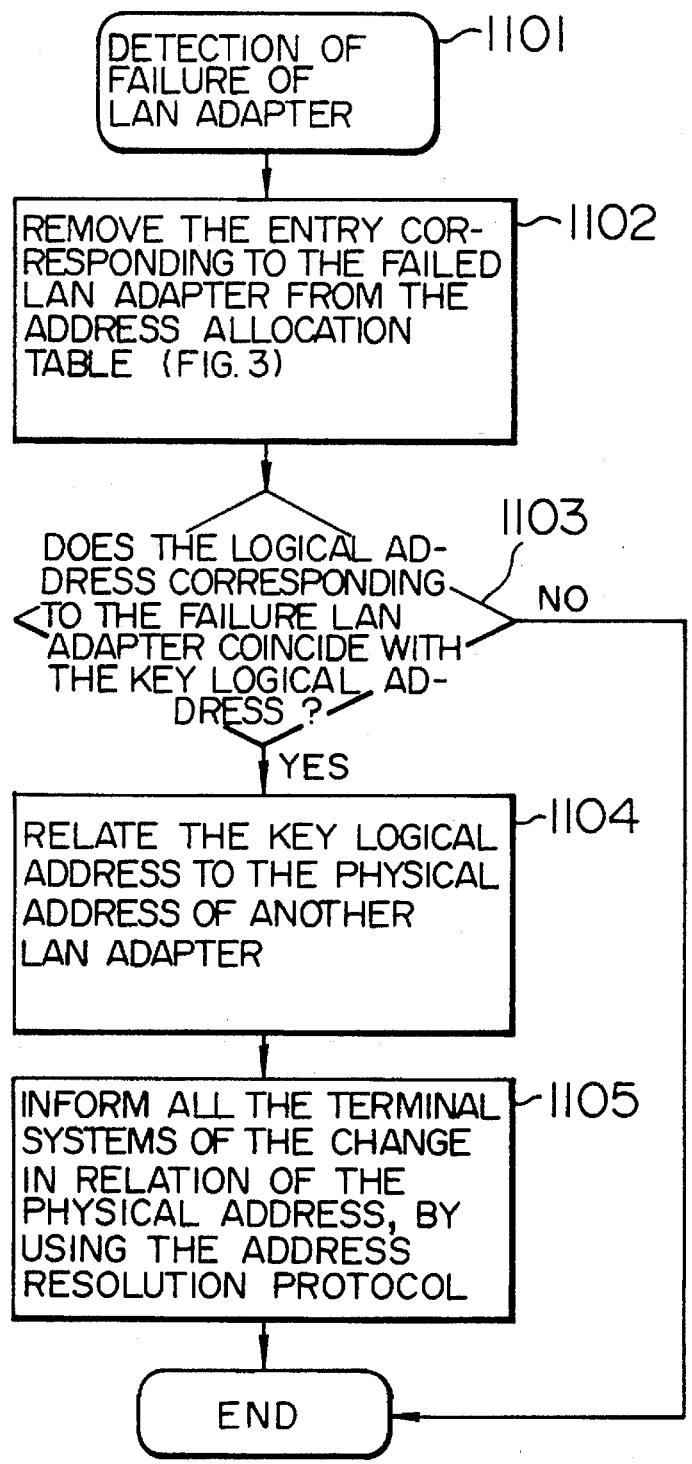
FIG. 11 is a flow chart showing processing in the host system at the time of detection of failure in an LAN adapter.
Figure 12:
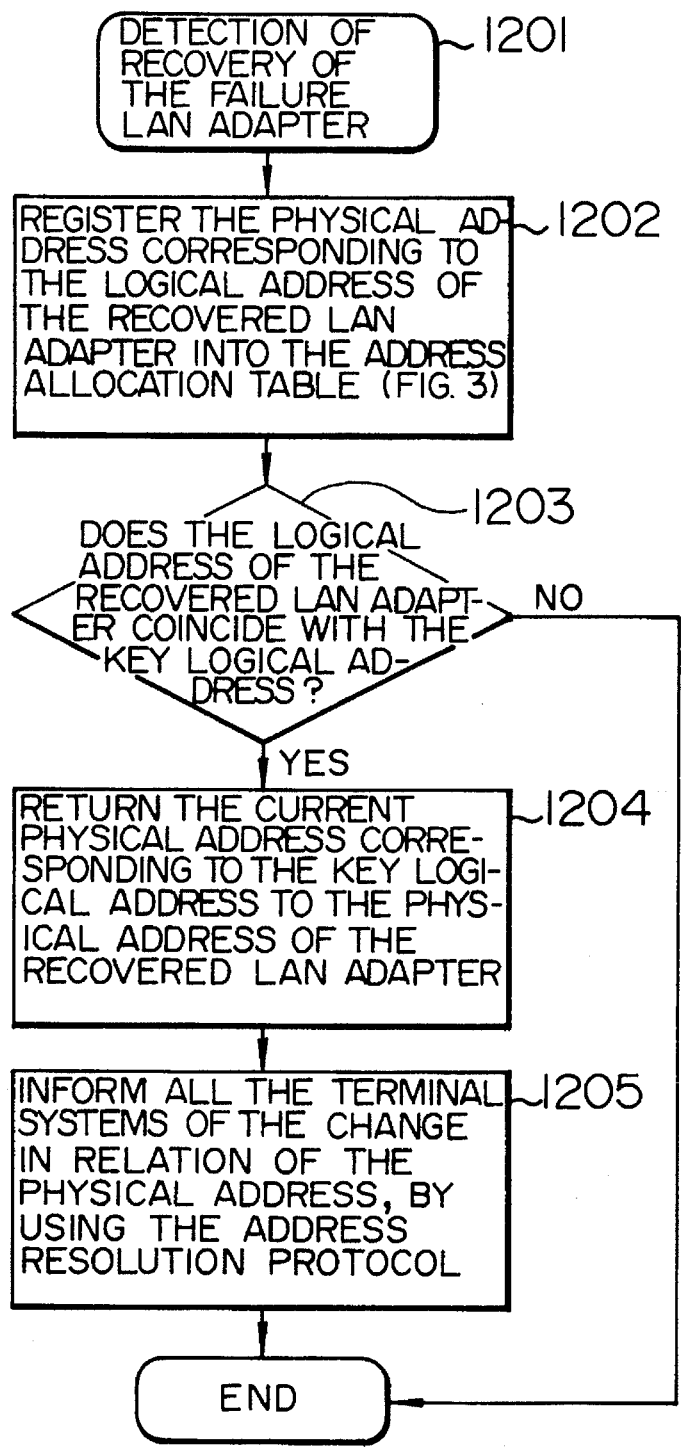
FIG. 12 is a flow chart showing processing in the host system at the time of recovery of an LAN adapter from failure.

Referring to FIGS. 11 and 12, processing in the host system in the case where any failure occurs in a certain LAN adapter will be described on the basis of the flow charts of FIGS. 11 and 12. In FIGS. 11 and 12, procedures of steps 1101 and 1201 are carried out by the LAN adapter interface control program 215, and the other procedures are carried out by the network layer control program 213.

In FIG. 11, first, when a failure occurs in one of the LAN adapters 111 to 113, the failure is detected by the LAN adapter interface control program 215 (step 1101). For example, the failure can be detected through detecting that the LAN adapter is responseless for a predetermined period. Then, an entry (physical address and logical address) corresponding to the failed LAN adapter is removed from the address allocation table (FIG. 3) (step 1102). Then, a judgment is made as to whether the logical address corresponding to the failed LAN adapter coincides with the key logical address A or not (step 1103). When the logical address does not coincide with the key logical address A, processing is terminated. When the logical address coincides with the key logical address A, step 1104 is carried out so that the key logical address A is related to a physical address $\underline{b}$ of another LAN adapter (for example, LAN adapter 112). That is, the physical address of the failed LAN adapter 111 is related to $\underline{b}$. Then, the host system informs all the terminal systems 102 and 103 that relation of the key logical address A is changed to the physical address $\underline{b}$, in accordance with the address resolution protocol (step 1105). Then, each of the terminal systems changes the physical address corresponding to the logical address A from $\underline{a}$ to $\underline{b}$ in the table of FIG. 8. Accordingly, thereafter each of the terminal systems recognizes the physical address $\underline{b}$ as a physical address corresponding to the logical address A and performs transmission.

In FIG. 12, when the failed LAN adapter recovers from the failure, the recovery is detected by the LAN adapter interface control program 215 (step 1201). Then, the logical address of the recovered LAN adapter and a physical address corresponding to the logical address are registered in the address allocation table (FIG. 3) (step 1202). Then, a judgment is made as to whether the logical address of the recovered LAN adapter coincides with the key logical address A or not (step 1203). When the logical address does not coincide with the key logical address A, processing is terminated. When the logical address coincides with the key logical address A, the current physical address $\underline{b}$ corresponding to the key logical address A is returned to the physical address $\underline{a}$ of the recovered LAN adapter 111 (step 1204). Then, the host system informs all the terminal systems 102 and 103 that the physical address corresponding to the key logical address A is changed from $\underline{b}$ to $\underline{a}$, in accordance with the address resolution protocol (step 1205). Then, each of the terminal systems returns the physical address corresponding to the logical address A from $\underline{b}$ to $\underline{a}$ in the table of FIG. 8. Accordingly, thereafter each of the terminal systems recognizes the physical address $\underline{a}$ as a physical address corresponding to the logical address A and performs transmission.

As described above, the host system relates the key logical address to another normal LAN adapter when a failure occurs in an LAN adapter corresponding to the key logical address. As a result, thereafter the terminal system transmits a message to the other LAN adapter automatically without consciousness of switching of LAN adapters. On the contrary, when a failure occurs in an LAN adapter not corresponding to the key logical address, the host system does not regard the failed LAN adapter as a subject of selection at the time of message transmission.

What is claimed is:

1. In an LAN system including a host system, a plurality of LAN adapters connected with the host system for providing a plurality of alternate communication paths to a local area network, and a plurality of terminal system connected with the local area network, a method of load distribution for message processing in the host system for facilitating communication of messages between the host system and the terminal systems, the LAN adapters providing a wait-before-transmit message capacity indicative of a delay before a next received message will be transmitted, the method comprising the steps of:

(a) setting a plurality of logical addresses for said host system in a one-to-one correspondence with physical addresses of said LAN adapters and selecting an arbitrary one of said logical addresses as a key logical address;

(b) setting said key logical address of said host system as a source logical address included in a message when said host system is to send said message to a selected one of said plurality of terminal systems; and (c) each time said host system is to send said messages to the selected one of said plurality of terminal systems selecting a least loaded one of said LAN adapters and sending said message through said selected LAN adapter to the local area network and to said selected one of said plurality of terminal systems, said selection of the least loaded one of said LAN adaptors examines the wait-before-transmit message capacities of each of said LAN adapters to identify:

a one of the LAN adapters having a wait-before-transmit message capacity not larger than a predetermined value for selection as said selected LAN adapter when the LAN adapter having the wait-before-transmit message capacity not larger than the predetermined value exists, and a one of the LAN adapters having the smallest wait-before-transmit message capacity for selection as said selected LAN adapter when none of the LAN adapters have a wait-before-transmit message capacity smaller than the predetermined value.

2. In an LAN system including a local area network, a host system, a plurality of LAN adapters connecting the host system with the local area network, and a plurality of terminal systems connected with the local area network each of said terminal systems having a first table in which a key logical address and a physical address of a one of the LAN adapters corresponding to said key logical address are set as a logical address of said host system and as a physical address of said host system, respectively, a method of load distribution for message processing in the host system comprising:

(a) setting a plurality of logical addresses for said host system correspondingly to physical addresses of said LAN adapters and selecting an arbitary one of said logical addresses as the key logical address;

(b) setting said key logical address of said host system as a source logical address included in a message, selecting one of said LAN adapters and sending said message through said selected LAN adapter and the local area network to one of said plurality of terminal systems; and, (c) setting the key logical address and the physical address in said first table.

3. A method of load distribution for message processing in the host system according to claim 2, further comprising the steps of:

(d) relating said key logical address to another normal LAN adapter when any failure occurs in said LAN adapter corresponding to said key logical address; and (e) prohibiting said host system from selecting a failed LAN adapter at the time of transmitting of message when any failure occurs in said LAN adapter not corresponding to said key logical address.

4. A method of load distribution for message processing in the host system according to claim 3, wherein said step (d) includes the substep of informing said plurality of terminal systems that said key logical address is related to said another normal LAN adapter.

5. A method of load distribution for message processing in the host system according to claim 3, wherein:

said host system is provided with a second table in which a physical address and a logical address are set correspondingly to each of said LAN adapters;

the physical address and logical address of a failed LAN adapter are removed from said second table so that said key logical address is related to the physical address of said normal LAN adapter in said second table.

6. A method of load distribution for message processing in the host system according to claim 4, wherein each of said terminal systems relates said key logical address to the physical address of said normal LAN adapter in said first table in response to the information.

7. A method of load distribution for message processing in the host system according to claim 3, further comprising the steps of:

(f) relating said key logical address to an LAN adapter recovering from failure when the LAN adapter corresponding to said key logical address recovers from failure; and (g) informing said plurality of terminal systems that said key logical address is related to said LAN adapter recovering from failure.

8. A method of load distribution for message processing in the host system according to claim 7, wherein:

said host system is provided with a second table in which a physical address and a logical address are set correspondingly to each of said LAN adapters;

the physical address and logical address of said LAN adapter recovering from failure are registered in said second table so that said key logical address is related to the physical address of said LAN adapter recovering from failure in said second table.

9. A method of load distribution for message processing in the host system according to claim 7, wherein each of said terminal systems relates said key logical address to the physical address of said LAN adapter recovering from failure in said first table in response to the information.

10. In an LAN system including a host system, a plurality of LAN adapters which connect the host system with a local area network, each of said LAN adapters performing protocol processing inclusive of a transport layer, and a plurality of terminal systems connected with the local area network, a method of load distribution for message processing in the host system comprising the steps of:

(a) setting a plurality of logical addresses for said host system corresponding to physical addresses of said LAN adapters and selecting an arbitrary one of said logical addresses as a key logical address; and (b) each time said host system is to send said message to one of said plurality of terminal systems, setting said key logical address of said host system as a source logical address included in a message, selecting said LAN adapter corresponding to said key logical address as said selected LAN adapter and sends said message through said selected LAN adapter to the local area network when the communication mode of said message is connection-oriented.

11. In an LAN system including a host system, a plurality of LAN adapters which connect the host system with a local area network, each of said LAN adapters performing protocol processing inclusive of a transport layer, and plurality of terminal systems connected with the local area network, a method of load distribution for message processing in a host system comprising the steps of:

(a) setting a plurality of logical addresses for said host system corresponding to physical addresses of said LAN adapters and selecting an arbitrary one of said logical addresses as a key logical address; and (b) each time said host system is to send said message to one of said plurality of terminal systems, setting said key logical address of said host system as a source logical address included in a message, selecting a least loaded LAN adapter as said selected LAN adapter from said plurality of LAN adapters and sends said message through said selected LAN adapter to the local area network when the communication mode of said message is connectionless.

* * * * *